(12) United States Patent
Gong et al.

(10) Patent No.: US 10,236,166 B1
(45) Date of Patent: Mar. 19, 2019

(54) LENSLET ARRAY BASED INTEGRAL FIELD SPECTROGRAPH AND DATA PROCESSING

(71) Applicant: The United States of America, as represented by the Administrator of the National Aeronautics and Space Administration, Washington, DC (US)

(72) Inventors: Qian Gong, Columbia, MD (US); David A. Content, Bowie, MD (US); Michael W. McElwain, Bethesda, MD (US); Avram Max Mandell, Silver Spring, MD (US); Tyler D. Groff, Silver Spring, MD (US); Maxime J. Rizzo, Edgewater, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/618,359

(22) Filed: Jun. 9, 2017

(51) Int. Cl.
*H01J 49/00* (2006.01)

(52) U.S. Cl.
CPC ...... *H01J 49/0018* (2013.01); *H01J 49/0022* (2013.01); *H01J 49/009* (2013.01)

(58) Field of Classification Search
USPC ....................................................... 250/288
See application file for complete search history.

(56) References Cited

U.S. PATENT DOCUMENTS

| 7,372,985 | B2* | 5/2008 | So | G06K 9/00127 |
|---|---|---|---|---|
| | | | | 382/133 |
| 7,414,712 | B2* | 8/2008 | Yoon | G01J 9/00 |
| | | | | 356/121 |
| 8,174,694 | B2* | 5/2012 | Bodkin | G01J 3/02 |
| | | | | 356/328 |
| 9,625,726 | B2* | 4/2017 | Chen | G01N 21/8806 |

OTHER PUBLICATIONS

Allington-Smith, "Basic principles of integral field spectroscopy", New Astronomy Reviews 50 (2006), pp. 244-251.*
Content; et. al., "New Microslice Technology for Hyperspectral Imaging", Remote Sens. 2013, 5, pp. 1204-1219.*

* cited by examiner

*Primary Examiner* — Phillip A Johnston
(74) *Attorney, Agent, or Firm* — Christopher O. Edwards; Bryan A. Geurts; Mark P. Dvorscak

(57) ABSTRACT

A lenslet based integral field spectrograph (IFS) may have a design that makes better use of the detector pixels by placing adjacent spectra next to each other rather than staggering the spectra. Such a design maintains the main compactness and simplicity of prior lenslet array based IFSs, but improves the detector efficiency, which is rather low in conventional lenslet array based IFSs.

19 Claims, 10 Drawing Sheets

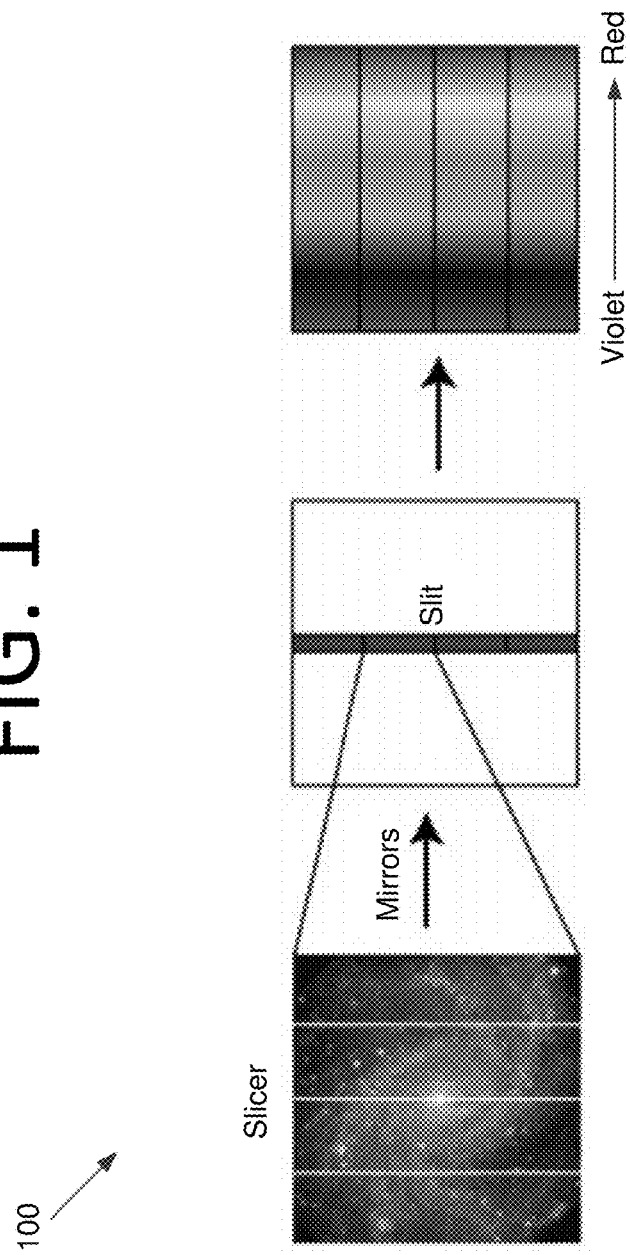

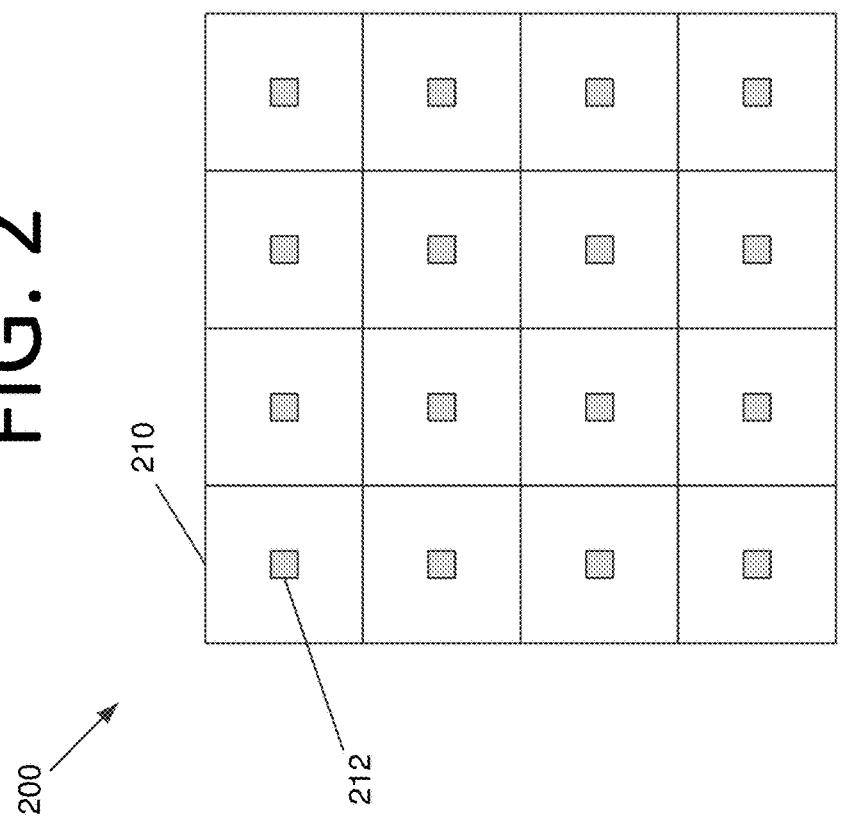

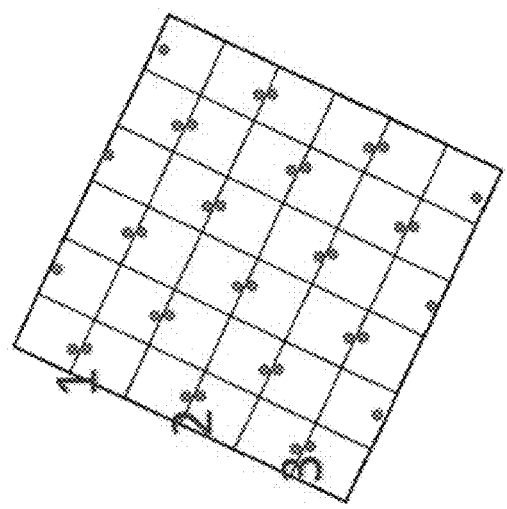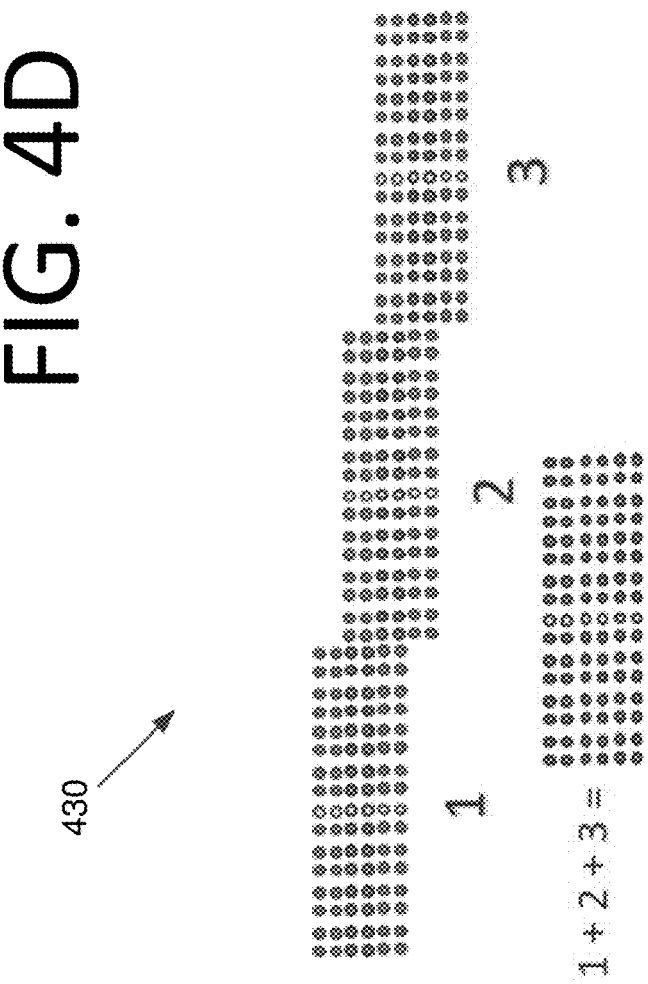
FIG. 4D

600

700

LENSLET ARRAY BASED INTEGRAL FIELD SPECTROGRAPH AND DATA PROCESSING

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to spectrographs, and more specifically, to a lenslet array based integral field spectrograph (IFS) with a geometry that increases detector pixel efficiency.

BACKGROUND

The Wide Field InfraRed Survey Telescope (WFIRST) includes a Coronagraph Instrument (CGI) that has baselined a lenslet based IFS to meet imaging and spectroscopy requirements. The current CGI IFS requirements are derived for the shaped pupil coronagraph (SPC) and the hybrid Lyot coronagraph (HLC), which are the two coronagraphs onboard the WFIRST/CGI. However, the WFIRST/CGI instrument must now be compatible with an external occulter (i.e., a starshade) that enables a wider instantaneous spectral bandpass and larger field of view. The detector requirements mandate a photon counting detector, which is only available in a 1024×1024 format, and provide a constraint on the number of detector pixels available to accommodate the new design requirements. Perhaps the only solution to this challenge would be to increase the detector efficiency of the IFS design by making each spatial sampling in the image plane use fewer pixels on the detector.

For an image slicer or any other slit image spectrograph, the crosstalk in the vertical direction is ignored because there is no offset in the spectral dimension. The general approach is shown in the split image spectrograph process 100 of FIG. 1. It is generally accepted that the spectrum versus field has a slow varying effect, or it is considered as spatial resolution. Based on this consideration, the lenslet array can group two spectral traces together to make room for a wider spectrum.

In conventional lenslet array based IFS designs, each lenslet focuses the incident light to a point near the center of the lenslet. In other words, the focus of the near-normal incident beam is at the center of the lenslet. Such a design is shown in lenslet array based IFS 200 of FIG. 2. As can be seen, for each lenslet 210, focus 212 of the normal incident beam is at the center thereof. Naturally, in practice, the array would have more than 4×4 lenslets, and the sixteen lenslets illustrated here are shown to illustrate foci locations.

In order to lay each spectrum without overlap from its neighbor, the spectra are staggered on the detector with spacing to avoid overlap. More specifically, the spectra are staggered such that they are well separated and only partially overlapping, allowing the spectra to be extracted without introducing spectral crosstalk therebetween. For science cases aiming at high dynamic range, such as the WFIRST/CGI IFS, each spectrum may occupy five rows to avoid crosstalk with its neighbors.

The staggering of the spectra may be problematic since one column of the detector will be occupied by different wavelengths of neighboring spectra, where the dynamic range could be quite high (e.g., when there are emission or absorption lines). Another disadvantage of current lenslet array based IFS designs is that the efficiency of detector pixel usage is relatively low. Accordingly, an improved design that improves the efficiency of detector pixel usage may be beneficial.

SUMMARY

Certain embodiments of the present invention may provide solutions to the problems and needs in the art that have not yet been fully identified, appreciated, or solved by conventional spectrographs. For example, some embodiments pertain to a lenslet based IFS having a design that makes better use of the detector pixels by placing adjacent spectra next to each other rather than staggering the spectra.

In an embodiment, a lenslet array based IFS includes a plurality of groups of lenslets. Foci for each group of lenslets are aligned perpendicular to a dispersion direction and proximate to one another, forming a line.

In another embodiment, an apparatus includes a plurality of groups of lenslets and a detector. Foci for each group of lenslets are aligned perpendicular to a dispersion direction and proximate to one another, forming a line. Adjacent spectra are placed next to one another. Each of the plurality of groups of lenslets comprises a plurality of lenslets with their spectral traces arranged in adjacent detector pixels.

In yet another embodiment, an apparatus includes a group of lenslets. Lenslets of the group of lenslets have their spectral traces arranged in adjacent detector pixels.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 illustrates a split image spectrograph process.

FIG. 2 is a top view illustrating a conventional lenslet array based IFS.

FIG. 4D illustrates combining of traces for a wavelength, according to an embodiment of the present invention.

DETAILED DESCRIPTION OF THE EMBODIMENTS

Some embodiments of the present invention pertain to a lenslet array based IFS having a design that makes better use of the detector pixels by placing adjacent spectra next to each other rather than staggering the spectra. Such a design maintains the compactness and relative simplicity of prior lenslet array based IFSs, but improves the detector efficiency, which is rather low in conventional lenslet array based IFS s. The applications of some embodiments include, but are not limited to, astronomy, aerospace, and biomedical applications.

Some embodiments achieve more efficient detector pixel usage than traditional lenslet based IFS, which makes the efficiency close to other existing types of IFSs, such as image slicers or fiber, without compromising their compactness and relative simplicity. Some embodiments do not require any fore optics to rearrange the slits or fibers as the input of the spectrometer. This can be a significant issue for flight instruments, where the mass and volume are tightly constrained. Even though some embodiments constitute a new IFS type that combines the advantages of all three existing types (lenslet based, image slicers, and lenslet/fiber), they may not require any new fabrication capabilities. In other words, existing dry etching technology is capable of fabricating the specialized lenslet array with custom curvature on each lenslet of some embodiments.

To accomplish these improvements, some embodiments arrange the lenslet foci so that the foci from each group of lenslets are aligned perpendicular to the dispersion direction, similar to a slit spectrometer. This arrangement removes the separation requirement between spectra in each group, greatly increasing the detector pixel usage efficiency. For example, if every four lenslets are grouped into one pseudo-slit, the detector pixel usage efficiency could increase by up to 150% as compared to a conventional lenslet array based IFS. This increased efficiency may be used to increase the field of view and the spectral bandwidth.

Figure 3B:
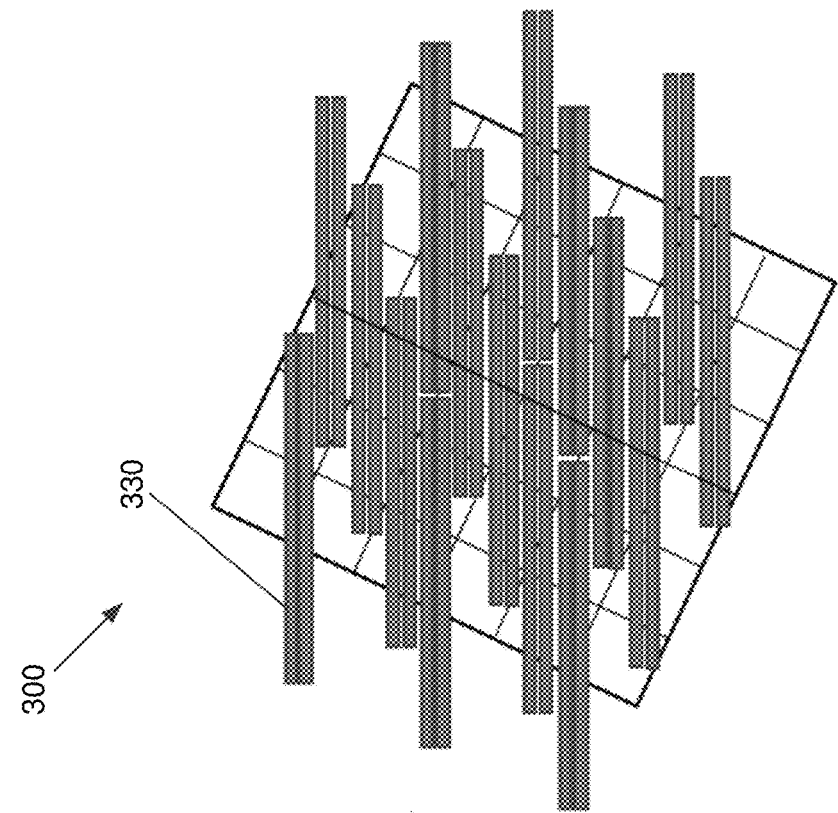
FIG. 3B is a rotated top view illustrating the lenslet array based IFS of FIG. 3A with spectral traces for pairs of lenslets lined up, according to an embodiment of the present invention.
Figure 3A:
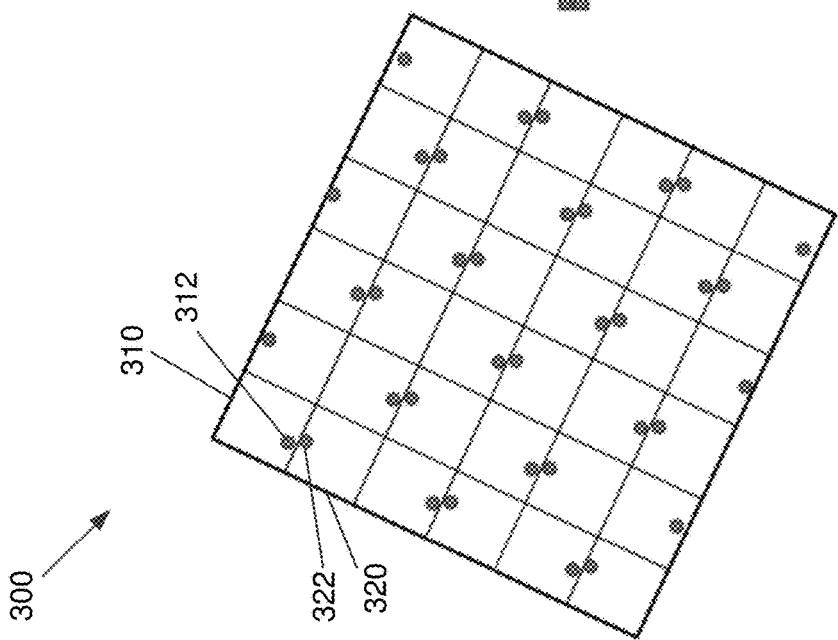
FIG. 3A is a rotated top view illustrating a lenslet array based IFS where pairs of lenslets are grouped, according to an embodiment of the present invention.

FIG. 3A is a rotated top view illustrating a lenslet array based IFS 300 where pairs of lenslets are grouped, according to an embodiment of the present invention. As seen in FIG. 3A, two adjacent lenslets 310, 320 have their lenslet axis positions 312, 322 arranged proximate to one another. While any two axis positions would technically form a line when lenslet pairs are used, in groups of three, four, or more lenslets, the axis positions would still be arranged to form a line.

Every two lenslets, such as lenslets 310, 320, are grouped to arrange their spectral traces in two adjacent detector pixels. Wavelengths for the two traces are lined up, as shown in wavelengths 330 of FIG. 3B. The size of the lenslets in FIGS. 3A and 3B is the same. The space saved by laying the two spectra side by side enables a wider spectral range.

If there is no gap between the two spectral traces, the original ten pixel rows for two traces becomes six, and the length of each trace can increase by 67%. Assume the spectral dispersion length lfor both original and proposed cases is the same and the requirement for crosstalk is the same (i.e., one row for the centroid and two rows on each side of the centroid). For the original case, the required number of pixels on the detector for two spectral traces is 1×10. For the proposed embodiment, only 1×6 pixels are required for two spectral traces. If adding one row between the two traces, the increase is 43%.

Data Processing for Multiple Dots

Figure 4A:
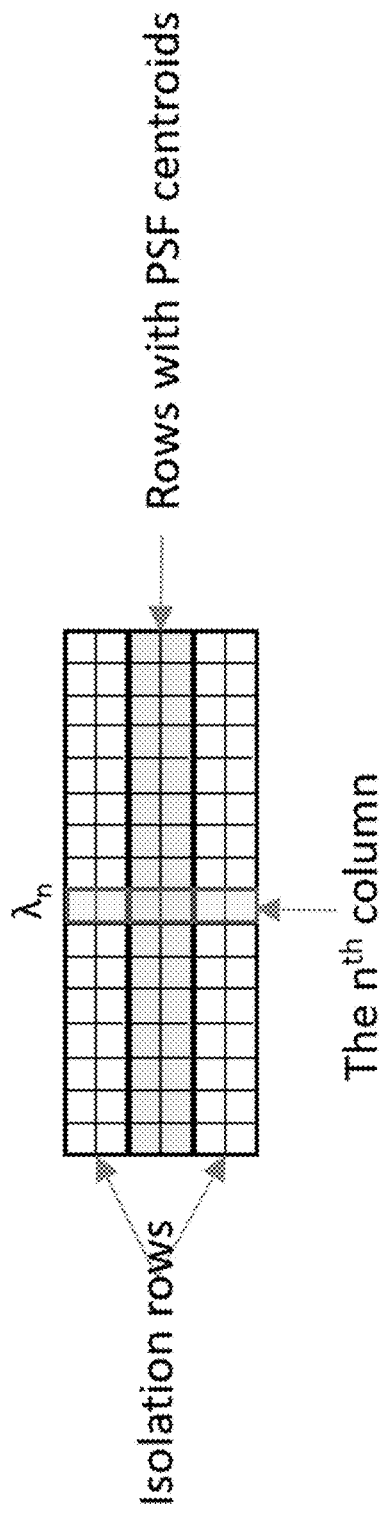
FIG. 4A illustrates lenslet rows versus wavelength columns for a lenslet array based IFS, according to an embodiment of the present invention.

A data process for multiple "dots," Point Spread Functions (PSFs), according to an embodiment of the present invention is described below. During calibration, a wavelength scan is performed and the image of each wavelength is recorded. The centroid position of each dot at each wavelength with respect to detector pixels for all combined traces is obtained. This is shown in diagram 400 of FIG. 4A, which shows lenslet rows versus wavelength columns. Isolation rows are shown in white, whereas rows with PSF centroids are shown in gray. The $n^{th}$ wavelength column $\lambda_n$ is also shown in gray.

While stars, for instance, are point sources, the image formed of stars by focusing through a lens is not a point, but rather, a blurred spot over a finite area on the image plane. Intensities can be described by a mathematical function, known as the PSF of the lens. The center of the area is found by estimating the center of mass (i.e., centroid) of the object.

Real data is processed in the dispersion direction first (i.e., horizontally), and the pixilation effect resulting from the finite size of the square lenslets is dealt with. More specifically, before interpolation, the wavelength of each combined trace at column n is slightly different due to pixilation, where n is arbitrary. After processing the real data, the combined traces in dispersion direction should have the same number of array elements, and the wavelength in each element should be the same for all traces in the group either via interpolation or to use filter match method (i.e., to use a calibrated PSF and centroid to extract the light in surrounding pixels that contribute to that wavelength).

Figure 4B:
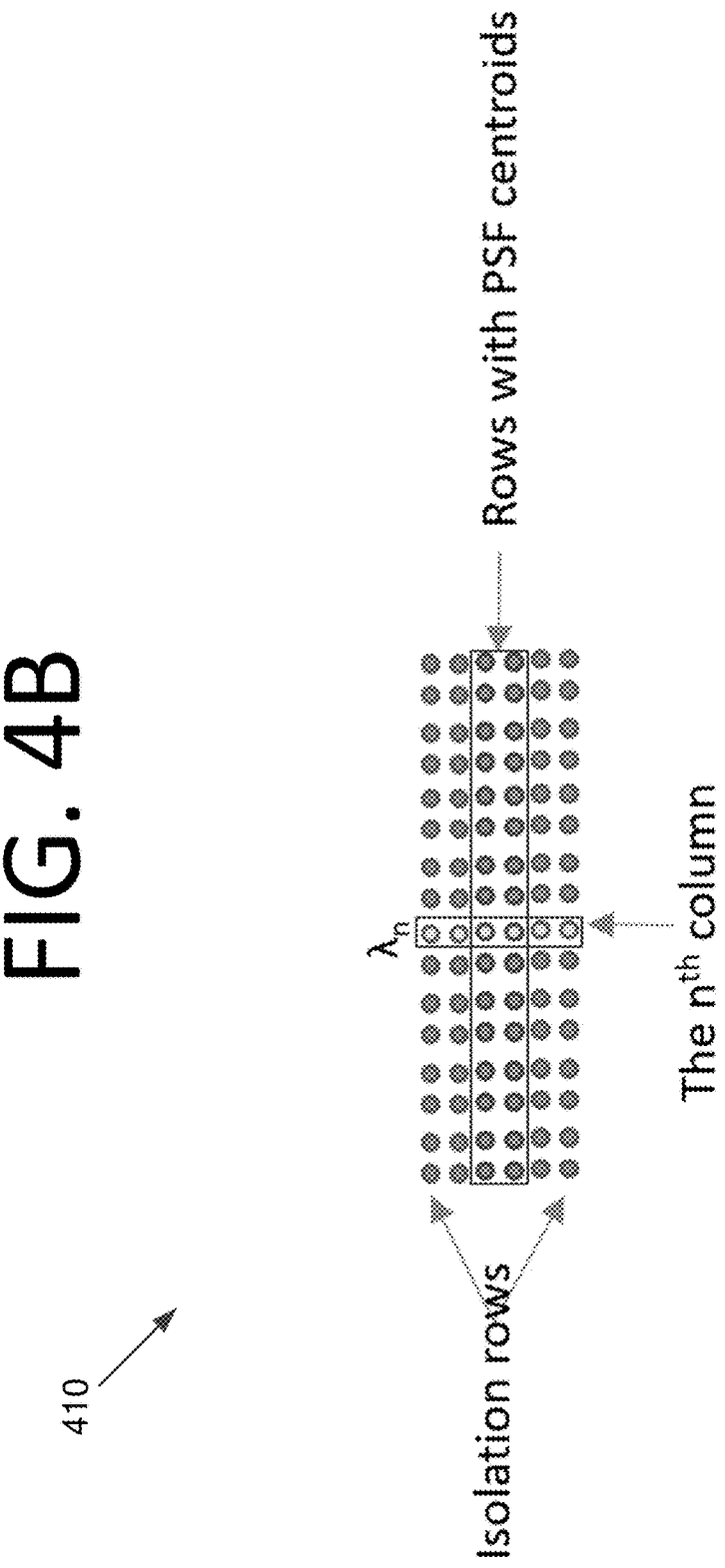
FIG. 4B illustrates "dots" after interpolation in the dispersion direction, according to an embodiment of the present invention.

Interpolation is performed, rendering the wavelength of each combined trace at column n the same. This produces the "dots" shown in diagram 410 of FIG. 4B. The $n^{th}$ column and rows with PSF centroids are contained in rectangles for illustration purposes only. It should be noted that FIG. 4B shows the data array, which should not be confused with the detector pixel reading.

Figure 4C:
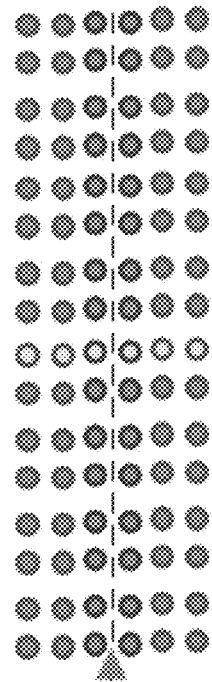
FIG. 4C illustrates "dots" after interpolation in the perpendicular direction with centroiding between the middle two rows, according to an embodiment of the present invention.

The data is then processed in the perpendicular (i.e., vertical) direction. The centroid of each combined trace is found. Due to the short length in dispersion length, the vertical centroid can be the average of all columns. Interpolation is then performed to set the centroid at the center of the 6 rows. This is shown in diagram 420 of FIG. 4C. In the case of a long dispersion length of over 50 pixels, the centroid for each column should be calculated and aligned.

All combined traces are then aligned with respect to the lenslet array geometry. The separation between any two traces vertically is 2. It is important to keep the isolation rows and let adjacent traces overlap since the isolation rows still carry photons.

The combining of the traces is shown in diagram 430 of FIG. 4D. More specifically, traces for lenslet pairs 1, 2, 3 are aligned, yielding the final spectrum of this column in the lenslet array. The final spectrum of each column in the lenslet array may thus be found, and all lenslet columns are processed in the same manner.

The final step may be to create a data cube. Each column in the data array corresponding to each lenslet column presents a unique $\lambda_n$. Thus, the final data sheet of each $\lambda_n$ is the collection of the same column from all columns in the lenslet array.

Figure 5:
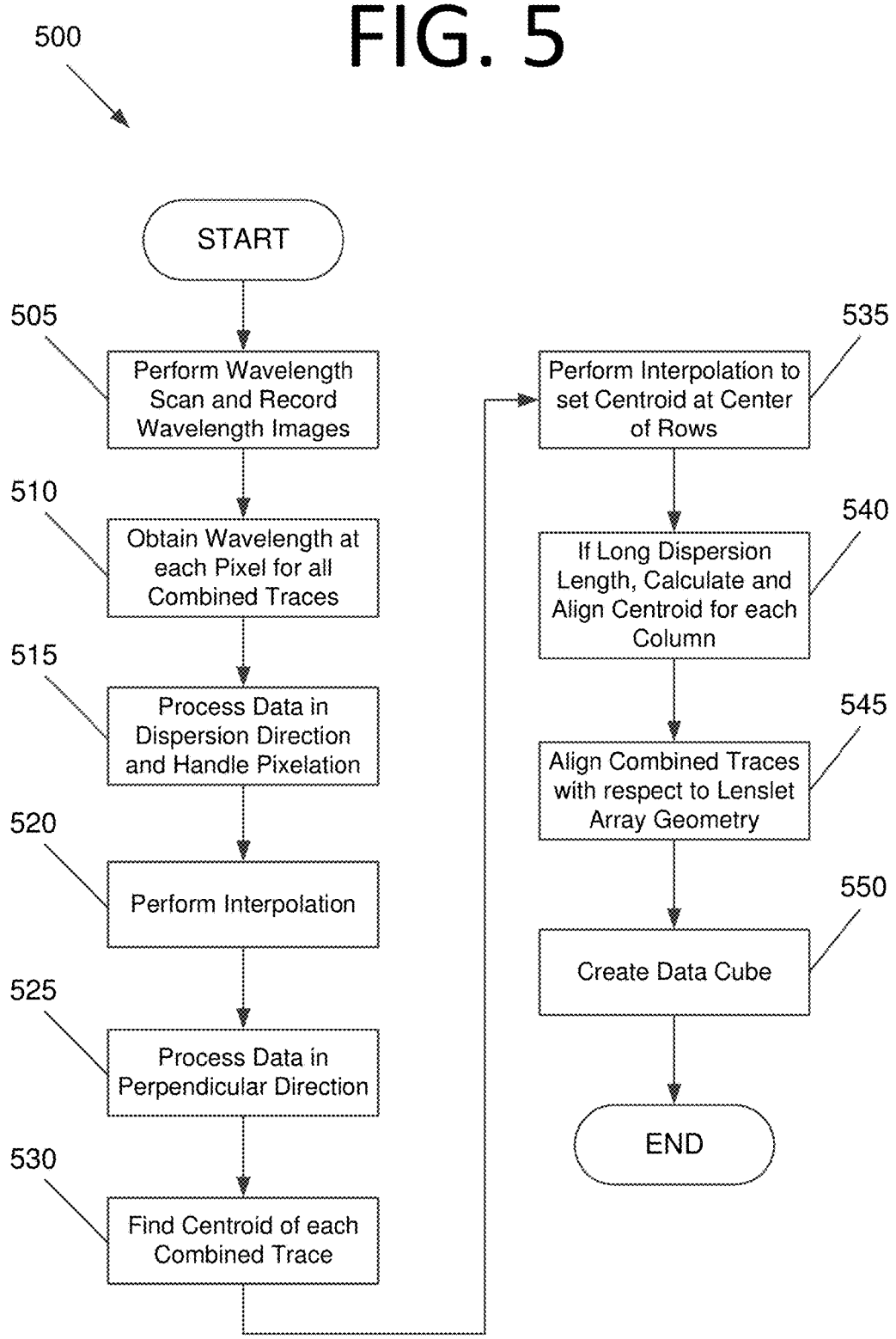
FIG. 5 is a flowchart illustrating a process for performing data processing for multiple dots, according to an embodiment of the present invention.

FIG. 5 is a flowchart 500 illustrating a process for performing data processing for multiple dots, according to an embodiment of the present invention. The process begins with performing a wavelength scan during calibration and recording the image of each wavelength at 505. The wavelength at each pixel is then obtained for all combined traces at 510.

Real data is processed in the dispersion direction first (i.e., horizontally), and the pixilation effect resulting from the finite size of the square lenslets is dealt with at 515. Interpolation is performed at 520, rendering the wavelength of each combined trace at column n the same. The data is then processed in the perpendicular (i.e., vertical) direction at 525, and the centroid of each combined trace is found at 530.

Interpolation is then performed to set the centroid at the center of the rows at 535. In the case of a long dispersion length, the centroid for each column is calculated and aligned at 540. All combined traces are then aligned with respect to the lenslet array geometry at 545. Finally, a data cube is created at 550.

Figure 6:
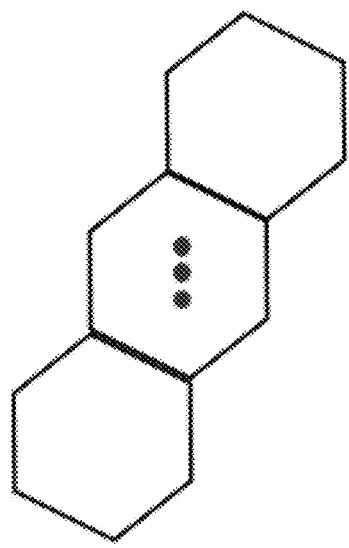
FIG. 6 illustrates a group of three hexagonal lenslets, according to an embodiment of the present invention.
Figure 7:
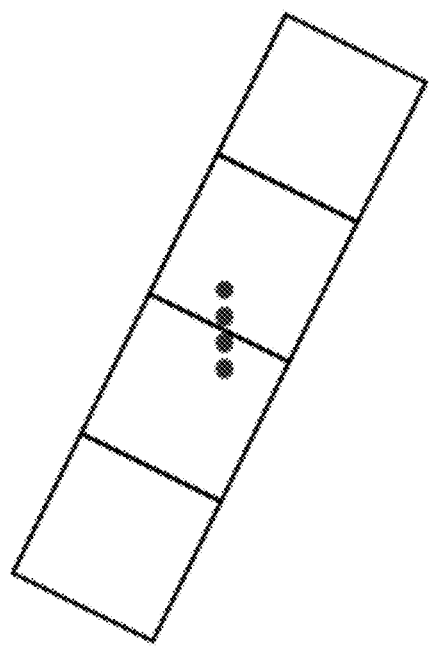
FIG. 7 illustrates a group of four square lenslets, according to an embodiment of the present invention.

The detector pixel efficiency may be increased even further if a pinhole mask is not needed for some applications. Slits can be applied to replace pinholes. For example, a hexagonally shaped "honeycomb" lenslet array can be used to combine three lenslets, as shown in hexagonal lenslets 600 of FIG. 6, or square lenslets could be used to combine four lenslets, as shown in lenslets 700 of FIG. 7. It should be appreciated that FIGS. 6 and 7 are merely a demonstration that three or four lenslets can be aligned. Any desired number of lenslets in any suitable shape may be used without deviating from the scope of the invention. The angle for each lenslet should be adjusted to the detector columns, depending upon the application, number of lenslets used, and shape. The optical axes are selected to form a straight line for each lenslet group. Generally speaking, using more lenses in each group will increase the efficiency of detector pixel usage.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A lenslet array based integral field spectrograph (IFS), comprising:
a plurality of groups of lenslets, wherein
foci for each group of lenslets are aligned perpendicular to a dispersion direction and proximate to one another, forming a line.

2. The lenslet array based IFS of claim 1, wherein adjacent spectra are placed next to one another.

3. The lenslet array based IFS of claim 1, wherein each of the plurality of groups of lenslets comprises two lenslets with their spectral traces arranged in two adjacent detector pixels.

4. The lenslet array based IFS of claim 1, wherein slits are used instead of a pinhole mask.

5. The lenslet array based IFS of claim 1, wherein lenslets of the plurality of groups of lenslets each have a hexagonal shape.

6. The lenslet array based IFS of claim 5, wherein each of the plurality of groups of lenslets comprises three or more lenslets.

7. The lenslet array based IFS of claim 1, wherein lenslets of the plurality of groups of lenslets each have a square shape.

8. The lenslet array based IFS of claim 7, wherein each of the plurality of groups of lenslets comprises four or more lenslets.

9. The lenslet array based IFS of claim 1, wherein at least one group of lenslets comprises lenslets with a different shape than another group of lenslets.

10. The lenslet array based IFS of claim 1, wherein lenslets of the plurality of groups of lenslets have a triangular shape, a square shape, a hexagonal shape, a rectangular shape, or any combination thereof.

11. The lenslet array based IFS of claim 1, further comprising:
a detector comprising 1024×1024 pixels.

12. An apparatus, comprising:
a plurality of groups of lenslets; and
a detector, wherein foci for each group of lenslets are aligned perpendicular to a dispersion direction and proximate to one another, forming a line, adjacent spectra are placed next to one another, and each of the plurality of groups of lenslets comprises a plurality of lenslets with their spectral traces arranged in adjacent detector pixels.

13. The apparatus of claim 12, wherein lenslets of the plurality of groups of lenslets each have a hexagonal shape, and each of the plurality of groups of lenslets comprises three or more lenslets.

14. The apparatus of claim 12, wherein lenslets of the plurality of groups of lenslets each have a square shape, and each of the plurality of groups of lenslets comprises four or more lenslets.

15. The apparatus of claim 12, wherein at least one group of lenslets comprises lenslets with a different shape than another group of lenslets.

16. The apparatus of claim 12, wherein lenslets of the plurality of groups of lenslets have a triangular shape, a square shape, a hexagonal shape, a rectangular shape, or any combination thereof.

17. An apparatus, comprising:

a group of lenslets, wherein lenslets of the group of lenslets have their spectral traces arranged in adjacent detector pixels wherein foci for each lenslet are aligned perpendicular to a dispersion direction and proximate to one another, forming a line.

18. The apparatus of claim 17, wherein the lenslets of the group of lenslets each have a triangular shape, a square shape, a hexagonal shape, a rectangular shape, or any combination thereof.

19. The apparatus of claim 17, wherein the group of lenslets comprises 3 or more lenslets.

* * * * *